United States Patent [19]

Krügel et al.

[11] 4,383,243
[45] May 10, 1983

[54] POWERLINE CARRIER CONTROL INSTALLATION

[75] Inventors: Karl-Heinz Krügel; Hermann Tappeiner; Ernst-Robert Paessler, all of Erlangen; Kurt Smutny, Neunkirchen, all of Fed. Rep. of Germany

[73] Assignee: Siemens Aktiengesellschaft, Munich, Fed. Rep. of Germany

[21] Appl. No.: 40,477

[22] Filed: May 18, 1979

[30] Foreign Application Priority Data

Jun. 8, 1978 [DE] Fed. Rep. of Germany ....... 2825249

[51] Int. Cl.³ .............................................. H04B 3/54
[52] U.S. Cl. .............................. 340/310 R; 333/24 C
[58] Field of Search ........ 340/310 R, 310 A, 310 CP; 333/23 C; 455/91, 114, 127, 282, 352

[56] References Cited

U.S. PATENT DOCUMENTS 2,336,258 12/1943 Kenefake ........................ 340/310 R
2,375,722  5/1945 Woodworth ................... 340/310 R
2,974,221  3/1961 Peth ...................................... 455/91
3,909,821  9/1975 Jagoda et al. .................. 340/310 R

FOREIGN PATENT DOCUMENTS 2461564 12/1974 Fed. Rep. of Germany .
 403078  7/1971 U.S.S.R. ......................... 340/310 A Primary Examiner—James J. Groody
Attorney, Agent, or Firm—Kenyon & Kenyon

[57] ABSTRACT

A powerline carrier control installation includes a control transmitter with an audio frequency output voltage, an isolation transformer, a coupling capacitor for parallel coupling to an a-c voltage network, and a device for suppressing a line frequency backward voltage. For coupling the audio frequency output voltage to the a-c voltage network, a resonant circuit tuned to the audio frequency is provided, the resonant circuit capacitance being supplied by the coupling capacitor and the resonant circuit inductance formed essentially by the main field inductance of the isolation transformer, eliminating the need for a separate coupling choke.

A device, specifically the powerline carrier control transmitter itself, is equipped to deliver, in addition to the audio frequency output voltage, a line frequency compensating a-c voltage which has a low amplitude in comparison to the line a-c voltage in order to suppress the line frequency feedback transmitted from the network.

7 Claims, 8 Drawing Figures

POWERLINE CARRIER CONTROL INSTALLATION

BACKGROUND OF THE INVENTION

This invention relates to a powerline carrier control installation in general and more particularly to a simplified installation of this type.

Powerline carrier control installations including a powerline carrier control transmitter which supplies an audio frequency output voltage; an isolation transformer fed on the primary side by the audio frequency output voltage and connected on the secondary side via a coupling capacitor in parallel to an a-c voltage network of given line a-c voltage and line frequency, the line frequency being somewhat lower that the audio frequency of the output voltage; a resonant circuit formed by the coupling capacitor and an inductance and whose resonant frequency is at least approximately tuned to the audio frequency; and a device arranged on the transmitter side of isolation transformer for suppressing a line-frequency feedback transmitted from the network side are known.

In a powerline carrier control installation with parallel coupling to the a-c voltage network, the audio frequency output voltage generated by the powerline carrier control transmitter must be brought, in a suitable manner, to the feed plane, that is, to the a-c voltage network, which may, for example, be a distribution system feeder a-c voltage network e.g., at about 10 Kv. The coupling unit required for this purpose should, for reasons of cost as well as of space, transport the audio frequency power generated by the powerline carrier control transmitter to the feed plane without any great losses and using as few parts as possible. At the same time, the coupling unit must intercept a-c voltage. In addition, the device for suppressing a line frequency feedback must make sure that the line frequency and its harmonics are kept away from the powerline carrier control transmitter to the extent that the latter is not disturbed in its operation.

A powerline carrier control (PCC) installation of the above mentioned kind with parallel coupling is illustrated in a single-phase, for example, in FIG. 1 of West German Patent Application DE-OS No. 2 461 564. Here a PCC installation where the parallel coupling us designed as a so-called "suction circuit coupling" is involved. The PCC transmitter feeds its audio frequency output a-c voltage to the primary winding of an isolation transformer. The secondary winding of the isolation transformer has its one end connected, via a series connection consisting of a coupling capacitor and a coupling choke, and its other end connected directly to a single phase a-c voltage network. The transformation ratio of the isolating transformer is normally, in existing installations, in the range of about 0.5:1 to 2:1, more particularly 1:1. The coupling capacitor and coupling choke are rated so that together they form a resonant circuit for the audio frequency. This resonant circuit acts as a suction circuit for the audio frequency output a-c voltage of the PCC transmitter. The suction circuit is damped essentially only by the ohmic portion of the load, that is, of the a-c voltage network. The coupling choke may be designed as a tuning choke to permit compensation of manufacturing tolerances of the suction circuit components and adaption to the reaction component of the network impedance. The loss resistances of the coupling elements (coupling choke and coupling capacitor) as well as the magnetization and leakage inductances of the isolation transformer may be negelcted in an evaluation of the mode of operation of such a powerline carrier control installation. In the known powerline carrier control installation, an audio frequency current supplied by the PCC transmitter, transmitted through the isolation transformer and flowing successively through the coupling choke and the coupling capacitor is coupled into the a-c voltage network. A line-frequency current (backward current) flows through the resonant circuit and is transmitted from the isolation transformer to the transmitting side again. Since this backward current has a disturbing effect on the PCC transmitter, a device for suppressing a corresponding line frequency feedback is provided on the transmitter side of the isolating transformer. What is involved here is a so-called resonance shunt, which takes over the backward current. In the known PCC installation, this resonance shunt consists of a suction circuit rated for line frequency, namely the series connection of a capacitor with a choke, this series connection being connected in parallel with the primary winding of the isolating transformer. In parallel with this series connection is a further capacitor, to compensate the effect of the suction circuit on the audio frequency output a-c voltage of the PCC transmitter. In a three phase form of construction the suction circuit coupling device consists of a three phase coupling capacitor battery, three coupling chokes in the form of tuning chokes, a three phase isolating transformer, and a three phase resonance shunt.

A characteristic feature of the known parallel coupling arrangement is that the PCC transmitter acts as a current source for the audio frequency current and is connected in series with the coupling elements (coupling capacitor, coupling choke) and with the network load. Thus the same current flows through PCC transmitter, the coupling elements and the network load.

It has been found that in a PCC installation with parallel coupling, the coupling unit is expensive and requires a considerable amount of space.

SUMMARY OF THE INVENTION

It is the object of the present invention to reduce the cost of a powerline carrier control installation of the above mentioned kind.

This object is achieved, according to the present invention, by connecting the secondary side of the isolating transformer directly to the a-c voltage network via the coupling capacitor and without insertion of a coupling choke which determines the resonant frequency, and using instead as the inductance of the resonant circuit, which together with the capacitance of the coupling capacitor establishes the resonant frequency of the resonant circuit, essentially only the main field inductance of the isolating transformer.

Accordingly, it is provided that, instead of the inductance of a coupling choke, the main field inductance of the isolating transformer serves as the resonant circuit inductance, and that this main field inductance together with the capacitance of the coupling capacitor forms a parallel resonant circuit, tuned at least approximately to the audio frequency. Therefore, by designing the isolating transformer with a defined main field inductance and connecting its secondary side directly via the coupling capacitor (which in three phase construction will be a three phase coupling capacitor battery) to the a-c voltage network to be controlled by audio frequency, one eliminates, in each phase, the coupling choke which in the prior is normally connected between the isolating transformer and the coupling capacitor.

In such a PCC installation, therefore, as has just been mentioned, in each phase, the coupling choke in series whith the coupling capacitor customary in prior art is omitted. This represents a considerable saving, since this coupling choke must normally be insulated for high voltages in each phase according to the voltage of the feed plane and its cost is correspondingly high. Also, the space required for the coupling choke(s) and the expense of installing and wiring is unnecessary. By comparison, the additional expense caused by the defined rating of the main field inductance of the isolating transforment is insignificant.

The present solution offers another advantage in that safety of operation is improved. While in the known PCC installation according to DE-OS No. 24 61 564 the line frequency voltage at the low voltage side primary terminals of the isolation transformer increases greatly when the feed lines are disconnected or interrupted in operation, in the present solution this voltage remaind constant in such a case, since the voltage divider conditions are not changed. Upon inadvertent shorting of the primary terminals, moreover, the present PCC installation is not endangered, since here the line frequency short circuit current is determined and controlled only by the capacitance of the coupling capacitor.

Therefore, the present POC installation viewed from the low-voltage side is no-load and short circuit proof.

The output voltage supplied by the PCC transmitter is transformed by the isolation transformer to the resonant circuit voltage. The resonant circuit voltage and hence the transformation ratio of the coupling transformer results from the voltage of the feed plane, the output voltage of the PCC transmitter, the resonant circuit quality, and the feed level. Since normally the output voltage is relatively small in relation to the required resonant circuit voltage, there results for the coupling transformer accordingly a high transformation ratio by comparison with the state of the art; it may be, for example, on the order of 1:10. But depending on the specific application, a higher ratio, e.g. 1:20, may also enter into consideration.

As noted previously, normally a device for suppressing a line frequency feedback, which in prior art is designed as a resonance shunt is arranged on the transmission side of the isolation transformer. The objective now is to reduce the cost of the PCC installation also with respect to this device. According to a further embodiment of the present invention, the cost with respect to those components which normally serve to reduce or completely to suppress the line frequency feedback coupled in from the network side of the isolation transformer to the transmitter side can be reduced by the fact that the PCC transmitter itself is provided as device for the suppression of the line frequency feedback, here a backward voltage. The PCC transmitter, therefore, must be adapted for suppression of the feedback by special measures; these measures consist in that, in addition to the audio frequency output voltage, the PCC transmitter also supplies a counter voltage to compensate the line frequency backward voltage. If the compensation is thus ensured, the mentioned resonance shunt can be omitted.

It should be noted that, whereas in the known PCC installation the line frequency current transmitted to the primary side must be taken up on the primary side of the isolation transformer by the mentioned resonance shunt, in the present solution a defined line frequency backward voltage must be intercepted on the transmitter side by additional measures.

According to a further embodiment of the present invention, the PCC transmitter is connected to the primary winding of the isolation transformer through an additional inductance. This inductance suppresses harmonic waves. It should be rated for a comparatively small isolation voltage. By the insertion of this additional inductance, of course, a slight detuning results if the resonant circuit is exactly tuned to the audio frequency. It is, however, possible to take this inductance into account from the start in tuning to audio frequency.

A preferred embodiment is distinguished by the features that:

(a) the PCC transmitter is connected to the primary winding of the isolation transformer with an additional inductance (also slightly influencing the resonant frequency), but without insertion of a capacitor determining the resonant frequency;

(b) the secondary winding of the isolation transformer is directly connected to the a-c voltage network via the coupling capacitor and without insertion of a choke determining the resonant frequency;

(c) the resonant frequency of the tuned resonant circuit is determined by the capacity of the coupling capacitor, the main field inductance of the isolation transformer, and the inductance, which is transmitted to the resonant circuit by the additional inductance;

(d) the transformation ratio of the isolating transformer is chosen greater than 1:5; and (e) the PCC transmitter itself is provided as the device for suppressing the line frequency feedback and is equipped so that it is able to take up a line frequency backward voltage which is low in comparison to the network a-c voltage.

DETAILED DESCRIPTION OF THE INVENTION

Figure 1:
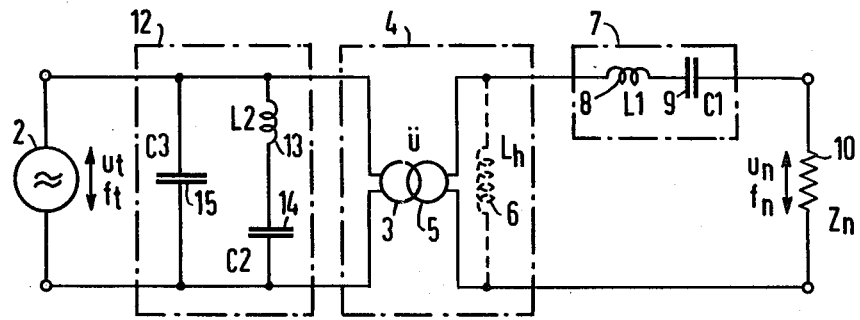
FIG. 1 shows a prior art powerline carrier control installation with parallel coupling.

FIG. 1 shows a known powerline carrier control installation with parallel coupling in single phase design, making use of a suction circuit for audio frequency (cf. DE-OS No. 24 61 564, FIG. 1). A powerline carrier control transmitter 2, supplying an output voltage $u_t$ of audio frequency $f_t$, feeds the primary winding 3 of an isolation transformer 4, having a secondary winding 5. The isolation transformer 4 is represented schematically. It has a main field inductance 6 of valve $L_h$, in parallel with the secondary winding 5. The stray field inductances of the isolation transformer 4 are neglected in the representation. In this design, the main field inductance $L_h$ is rated so that its effect with respect to the transmitted audio frequency voltage can be neglected. This is the case when it is rated relatively high. To indicate the negligible effect, coil 6 is shown only in broken lines. The isolation transformer 4 further has a ratio of transformation u, which is illustrated by the two interengaging rings. This ratio is normally 1:1.

The secondary winding 5 of the isolating transformer 4 is connected in parallel to an a-c voltage network 10 via a resonant circuit 7 consisting of the series connection of a coupling choke 8 of inductance L1 and a coupling capacitor 9 of capacitance C1. The resonant circuit 7 is tuned to the audio frequency $f_t$. It thus acts as a suction circuit for the audio frequency $f_t$. For the suction circuit effect the main field inductance $L_h$ is negligible.

For greater simplicity, the a-c voltage network 10 is here shown as an ohmic load of impedance $Z_n$. This a-c voltage network 10 carries a line a-c voltage $u_n$ of line frequency $f_n$, the line frequency $f_n$ being somewhat lower than the audio frequency $f_t$, and the line a-c voltage $u_n$ somewhat higher than the input level of the audio frequency feed voltage.

The known PCC installation further comprises a device 12 arranged on the transmitter side of the isolation transformer 4 for suppressing a line frequency backward voltage. This device 12 consists of a resonance shunt arranged parallel to the primary winding 3 and formed of the series connection of a choke 13 with a capacitor 14. With respect to its resonant frequency, provided by inductance L2 and capacitance C2, the series connection is tuned to the line frequency $f_n$. In parallel with the series connection of elements 13 and 14 there is a further capacitor 15, to compensate the effect of the series connection on the output a-c voltage $u_t$ of the PCC transmitter 2.

Figure 2:
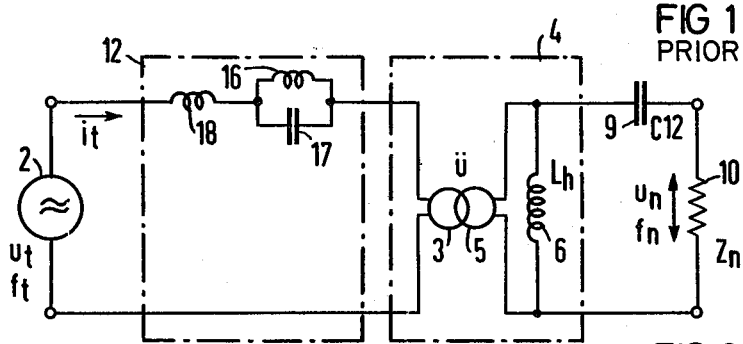
FIG. 2 shows a PCC installation according to one embodiment of the present invention.

As distinguished therefrom, FIG. 2 shows an embodiment of the present invention. As compared with FIG. 1, in the PCC installation according to FIG. 2 two essential differences must be noted: For one thing, coil 6 is shown in solid lines, as its inductance $L_h$ cannot be neglected for the effective resonant circuit, and for another, there is no coupling choke 8.

In the present case, the main field inductance $L_h$ of the isolating transformer 4 is rated so that, at audio frequency $f_t$, it is the frequency determining inductance in the resonant circuit consisting of isolation transformer 4 and coupling capacitor 9. In other words, the main field inductance $L_h$ of the isolating transformer 4 and the capacitance C12 of the coupling capacitor 9 together are rated so that that isolation transformer 4 and the coupling capacitor 9 form a resonant circuit tuned to the audio frequency $f_t$. Hence for the audio frequency $f_t$ the equations $X_c = X_h$ with $X_c = \frac{1}{2\pi f_t C12}$ and $X_h = 2\pi f_t L_h$ are valid. The isolation transformer 4, again conceived to be low in leakage, does not, in the present case, serve only for the d-c separation of the PCC transmitter 2 from the a-c voltage network 10; its main field inductance $L_h$ forms at the same time the determining resonant circuit inductance.

Thereby, compared with the conventional coupling according to FIG. 1, one component per phase is eliminated, namely the coupling choke 8 in FIG. 1. The secondary winding 5 is thus connected directly to the a-c voltage network 10 via the coupling capacitor 9, without insertion of a special frequency determining coupling choke 8.

A line frequency feedback which produces a voltage drop at coil 6 representing the main field inductance $L_h$ of the isolating transformer 4 flows from the a-c voltage network 10 through the series circuit including capacitor 9 and coil 6. This voltage drop is compensated by the device 12 for suppressing a line frequency. Device 12 thus is a blocking circuit for the line frequency. It comprises a parallel resonant circuit tuned to the line frequency $f_n$, including a choke 16 and a capacitor 17, and a further choke 18 connected in series therewith. This additional choke 18 brings the impedance of device 12 to a minimum, for the audio frequency $f_t$, so that the audio frequency output current $i_t$ can get to the primary winding 3 of the isolation transformer 4 without major losses. Thus the PCC transmitter 2 is coupled to the isolating transformer 4 with low impedance. The resonant circuit including elements 16 to 18 also damps harmonics both of the audio frequency and of the line frequency.

The balancing of the resonant circuit made up of capacitor 9 and coil 6 can be accomplished in the PCC installation according to FIG. 2 by changing the main field inductance $L_h$. This is expediently done by changing the air gap of the isolating transformer 4.

Figure 3:
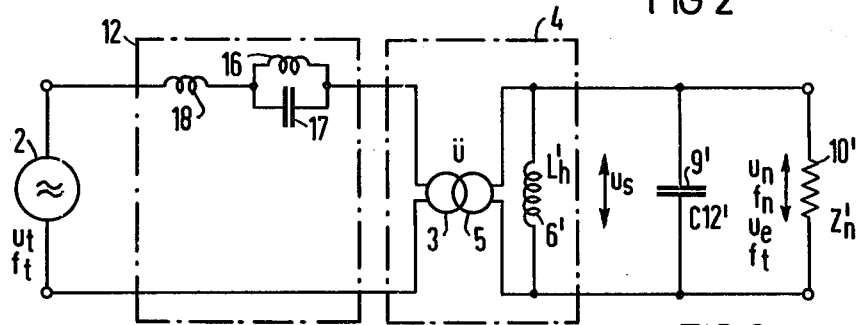
FIG. 3 is an equivalent circuit diagram for the PCC installation of FIG. 2.

FIG. 3 shows an equivalent circuit diagram for the PCC installation according to FIG. 2. A choke 6' representing the main field inductance $L_h'$ forms, with an equivalent capacitor 9' of capacitance C12', a parallel resonant circuit for the audio frequency $f_t$. The capacitance C12' of the equivalent capacitor 9' and the impedance $Z_n'$ of the equivalent a-c voltage network 10' result, according to known rules, from the values of the components 6, 9 and 10 of FIG. 2. In the present case the equation $X_h' = X_c'$ holds for the audio frequency $f_t$, with $X_h' = 2\pi f_t L_h'$ and $X_c' = \frac{1}{2\pi f_t C12'}$. The impedance $Z_n'$, as parallel damping, is correspondingly greater than the impedance $Z_n$. This means that, in comparison with FIG. 1, assuming a ratio of transformation U=1:1, the PCC transmitter 2 must supply a higher voltage $u_t$, but only a lower output current, if in both cases the same audio frequency power is to be delivered.

With regard to FIG. 3 it should be noted that the PCC transmitter 2, acting as a voltage source, is connected to the two coupling elements 6' and 9' as well as to the equivalent a-c voltage network 10'. The parallel resonant circuit consisting of the two coupling elements 6' and 9' is thus damped in parallel by the equivalent a-c voltage network 10'. While for the conventional PCC installation according to FIG. 1 the feed current successively flowing through the elements 8, 9 and 10 is characteristic, for the PCC installation according to FIG. 3 the audio frequency secondary voltage $u_s(f_t)$ of the isolation transformer 4 connected at the same level to the elements 6', 9' and 10' may be regarded as characteristic.

If in the two PCC installations according to FIGS. 1 and 2 the same PCC transmitter 2 is to be used, the transformation ratio ü in FIG. 2 must be chosen higher than 1:1. This is indicated in the PCC installation according to FIG. 4 by the enlarged circle for the secondary winding 5. In this PCC installation the transformation ratio ü is, for example, 1:10. Thereby the audio frequency output voltage $u_t$ supplied by PCC transmitter 2 is stepped up in the direction of the network side. At the same time, however, the chosen higher transformation ratio ü results in the line frequency backward voltage transmitted to the transmitter side being stepped down. (Because of the line frequency back current through the coupling capacitor 9, this backward voltage, as has been mentioned, drops at the main field inductance $L_h$ of the isolation transformer). This step-down is particularly advantageous, since the device 12 for suppressing the feedback then need only be rated for a relatively low voltage. Another advantage of this increased transformation ratio ü is that the transmitter side primary winding 3 can be operated open without the occurrence of any dangerously high voltages.

Also the following must be regarded as an advantage: If in the PCC installation according to FIG. 2 an interruption occurs between the PCC transmitter 2 and the isolation transformer 4, then, in contrast to prior art, there is no need to fear that the backward voltage transmitted by transformer from the network side will increase. This has advantageous effects with regard to the required insulation of the individual components and feed lines and the selection of the spacing of the terminals.

Figure 4:
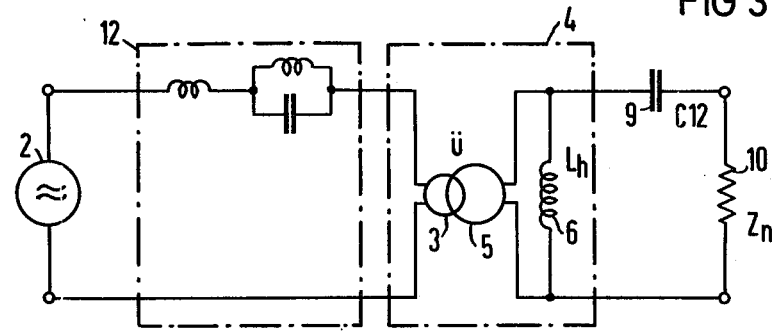
FIG. 4 is a variant of the embodiment according to FIG. 2 with an increased ratio of transformation.
Figure 5:
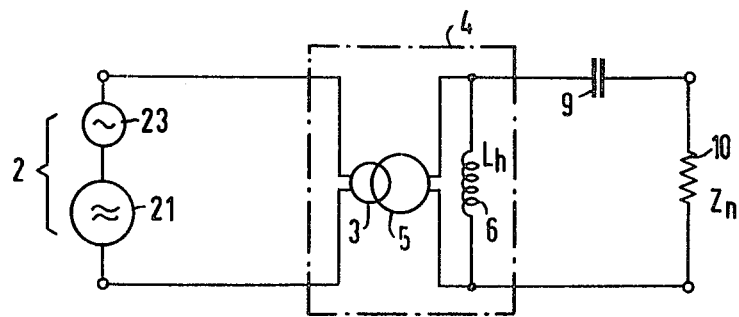
FIG. 5 is a variant of the embodiment according to FIG. 4 with a PCC transmitter which is enabled to take up a line frequency backward voltage.

FIG. 5 shows an advanced variation of the PCC installation according to FIG. 4. This form of construction is based on the reasoning that device 12, designed as resonance shunt, can be omitted altogether if the PCC transmitter 2 is enabled to compensate the line frequency backward voltage transmitted by transformer to the transmitter side. Accordingly, the PCC transmitter 2 must be able to supply, in addition to the audio frequency output voltage $u_t$, line frequency counter voltage, correct in phase and amplitude, which counteracts the backward voltage. This is indicated schematically in FIG. 5 by the fact that the PCC transmitter 2 consists of the series connection of an audio frequency generator 21 with a line frequency generator 23. In actual practice, of course, a single inverter, built up of thyristors, for example, and operating on the principle of pulse width control can be used as the PCC transmitter 2. This inverter can be controlled so that, at its output, a line frequency a-c voltage with a superimposed audio frequency a-c voltage occurs.

Figure 6:
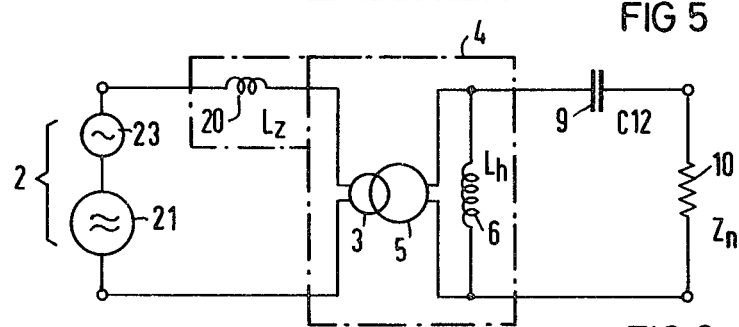
FIG. 6 illustrates a PCC installation according to a further embodiment of the present invention.

According to FIG. 6, the PCC transmitter 2 is connected to the primary winding 3 of the isolation transformer 4 with insertion of an additional choke 20 having an inductance $L_z$. The PCC transmitter 2 is like that of FIG. 5 and can take up the line frequency backward voltage. The isolation transformer 4 is constructed for minimum leakage. The additional inductance $L_z$ is intended to damp harmonics coupled in from the network side, these occurring together with the line-frequency backward voltage, and having frequencies which are integral multiples of the line frequency $f_n$. The choke 20 may be integrated in the PCC transmitter 2 or, as shown in dotted lines at the isolation transformer 4, be included structurally in the isolation transformer 4. This choke 20 should be rated for an isolation voltage which is small in comparison to the line a-c voltage $u_n$.

Figure 7:
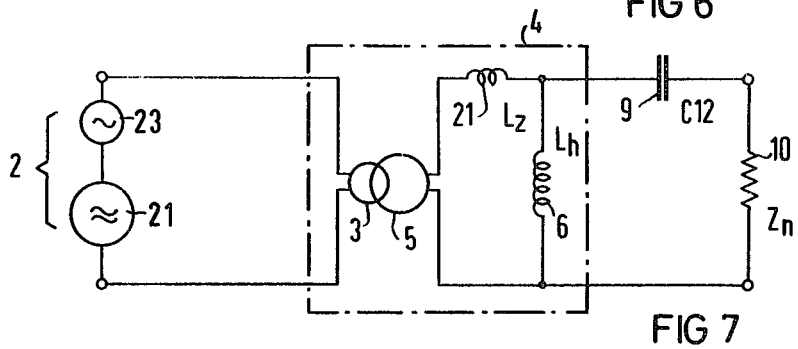
FIG. 7 illustrates another embodiment of the present invention.

In the embodiment according to FIG. 7, an additional inductance $L_z$ for damping the harmonics in the line frequency backward voltage is also provided. But here this additional inductance $L_z$ is formed, not by a separate component, but by the leakage inductance of the isolation transformer 4. This leakage inductance is represented in FIG. 7 as an inductive element 21. In the embodiment according to FIG. 7, therefore, the isolation transformer 4 is purposely constructed with a non-negligible leakage inductance.

In considering FIGS. 6 and 7, it has heretofore been tacitly assumed that the values C12 and $L_h$ are matched so that a resonant circuit for the audio frequency $f_t$ results. The insertion of the additional inductance $L_z$ would lead to a certain detuning of the resonance. It is therefore expedient to include the additional inductance $L_z$ in the determination of the resonant frequency from the start. The additional choke 20 in FIG. 6 or the leakage inductance 21 in FIG. 7 is then part of the resonant circuit tuned to the audio frequency $f_t$.

Figure 8:
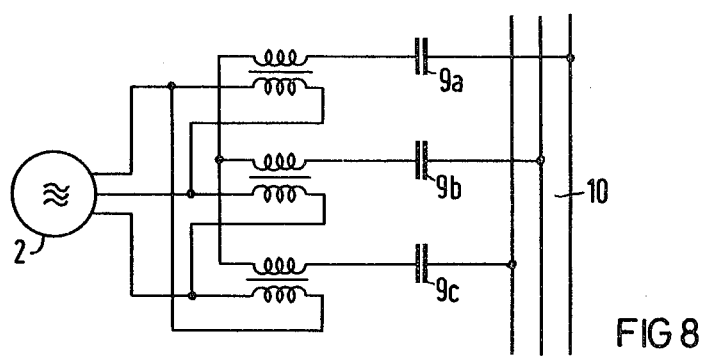
FIG. 8 illustrates a PCC installation corresponding to FIG. 2 in a three phase design.

In FIG. 8 a three phase form of the PCC installation according to FIG. 2 is shown. The PCC transmitter 2, e.g., again an inverter, delivers three output voltages of audio frequency $f_t$, mutually shifted by 120° el. At the same time, it is arranged so that it can also receive three line frequency backward voltages mutually shifted by 120° el. The PCC transmitter 2 may then be designed so that it has a high internal resistance for the backward voltages. It is connected to the primary winding of an isolation transformer 4 by direct connection. This isolation transformer 4 is in star-delta construction; a star-star construction is also possible. The neutral point of the isolation transformer 4 need not be grounded. The transformation ratio of each partial winding pair is for instance 1:10. Each secondary terminal is connected to a phase conductor of a three-phase a-c voltage network 10. If the a-c voltage network 10 has only slight harmonic waves or none at all, the isolation transformer 4 may be constructed in the form of three chokes, each with an auxiliary winding.

Lastly, an example with numerical values will be given for the equivalent circuit diagram shown in FIG. 2.

It is assumed that the line frequency $f_n = 50$ Hz, the audio frequency $f_t = 317$ Hz, that the line a-c voltage $u_n$ has an effective value of 10 kV, and that the feed level p for the audio frequency feed voltage $u_e$ is to be 1.7% of the line a-c voltage $u_n$. In a single pole equivalent circuit this results in an effective value for the feed voltage $u_e$ of $u_e = 1.7\% \times 10^4 \sqrt{3} = 98.1$ V, or approximately 100 V. The network load may be, for example, (1+j2.8) Ohm, the reactive component being given by the impedance of the 10 kV transformer supplying the line a-c voltage, and the impedance being connected in parallel with the ohmic network resistance.

A value of capacitance C12 = 8 μF is selected. From this the impedance $X_c$ of capacitor 9 for the audio frequency $f_t$ is calculated as 62.8 Ohm, and for line frequency $f_n$ as 398 Ohm. The audio frequency secondary voltage $u_s$ was taken as $u_s = 2$ kV. For an impedance $X_h = 2\pi f_t L_h = 60$ Ohm (approximately resonant), referred to the audio frequency $f_t$, one obtains $L_h = 30$ mH. For the line frequency $f_n$ this value of $L_h$ results in an impedance $X_h = 9.5$ Ohm. Since the line frequency $f_n$ is distinctly lower than the audio frequency $f_t$, $X_h(f_n)$ is smaller than $X_h(f_t)$. Hence only a small line frequency secondary voltage $u_s(f_n)$ of 141 V drops across transformer 4. Let the transformation ü of the isolation transformer 4 be ü = 1:10. The secondary voltage $u_s(f_n)$ is further reduced by this ratio, so that, on the primary side, a line frequency backward voltage $u_p(f_n)$ of 14.1 V (conductor voltage of about 24.4 V) results. An appropriately equipped powerline carrier control transmitter 2 can absorb this slight backward voltage.

What is claimed is:

1. A powerline carrier control installation comprising:

(a) a powerline carrier control transmitter which supplies an audio frequency output voltage;

(b) an isolation transformer having a main field inductance and having a transformation ratio higher than 1:5 fed on the primary, low voltage side by the audio frequency output voltage;

(c) a coupling capacitor coupling the secondary side of said transformer to an a-c voltage network of given distribution system feeder a-c voltage and line frequency, the line frequency being somewhat lower than the audio frequency of the output voltage;

(d) said coupling capacitor along with the main field inductance of the isolating transformer forming a tuned resonant circuit the resonant frequency of which is at least approximately tuned to the audio frequency; and (e) said powerline carrier control transmitter acting as a device for suppressing the line frequency backward voltage transmitted from the network side, the control transmitter being equipped to deliver, in addition to the audio frequency output voltage, a line frequency compensating a-c voltage which is low in amplitude in comparison to the line a-c voltage.

2. A powerline carrier control installation comprising:

(a) a powerline carrier control transmitter which supplies an audio frequency output voltage;

(b) an isolation transformer having a main field inductance and having a transformation ratio higher than 1:5 fed on the primary, low voltage side by the audio frequency output voltage;

(c) a coupling capacitor only, coupling the secondary side of said transformer directly to an a-c voltage network of given distribution system feeder a-c voltage and line frequency, the line frequency being somewhat lower than audio frequency of the output voltage;

(d) an additional inductance only, coupling the powerline carrier control transmitter to the primary winding of the isolation transformer;

(e) said coupling capacitor along with the main field inductance of the isolating transformer and additional inductance forming a tuned resonant circuit the resonant frequency of which is at least approximately tuned to the audio frequency, the resonant frequency of said tuned resonant circuit being determined by the capacitance of the coupling capacitor, the main field inductance of the isolation transformer and the additional inductance transmitted to the secondary winding of the transformer; and (f) the powerline carrier control transmitter being equipped to take up a line frequency backward voltage which is low in amplitude in comparison to the line a-c voltage and itself acting as a device for suppressing a line frequency feedback transmitted from the network side.

3. A powerline carrier control installation according to claim 1, wherein said powerline carrier control transmitter is coupled to the primary winding of the isolation transformer through only an additional inductance.

4. A powerline carrier control installation according to claim 1, wherein the powerline carrier control transmitter is coupled to the primary winding of the isolation transformer at most through only an additional inductance, and wherein the main field inductance of the isolation transformer, the capacitance of the coupling capacitor, and said additional inductance are rated so that for audio frequency the inductive impedance of the circuit including of these components equals the capacitive impedance.

5. A powerline carrier control installation according to claim 3 or 2, wherein said additional inductance is formed by an additional choke connected in series with the primary winding of the isolation transformer.

6. A powerline carrier control installation according to claim 5, wherein said additional choke is structurally included in the isolating transformer.

7. A powerline carrier control installation according to claim 3 or 2, wherein said additional inductance is formed by a non-negligible leakage inductance of the isolation transformer.

* * * * *